US00RE46222E

(19) United States
(12) Reissued Patent
Moon et al.

(10) Patent Number: US RE46,222 E
(45) Date of Reissued Patent: Nov. 29, 2016

(54) DISPLAY SUBSTRATE WITH DUAL TRANSISTOR AND CONNECTION TRANSISTOR, METHOD OF MANUFACTURING THE DISPLAY SUBSTRATE AND DISPLAY DEVICE HAVING THE DISPLAY SUBSTRATE

(71) Applicant: SAMSUNG DISPLAY CO., LTD., Yongin, Gyeonggi-Do (KR)

(72) Inventors: Sung-Jae Moon, Seoul (KR); Dong-Gyu Kim, Gyeonggi-do (KR); Yoon-Jang Kim, Gyeonggi-do (KR); Gwang-Bum Ko, Chungcheongnam-do (KR)

(73) Assignee: SAMSUNG DISPLAY CO., LTD., Yongin, Gyeonggi-Do (KR)

(21) Appl. No.: 14/582,238

(22) Filed: Dec. 24, 2014

Related U.S. Patent Documents

Reissue of:
(64) Patent No.: 8,054,396
Issued: Nov. 8, 2011
Appl. No.: 12/368,719
Filed: Feb. 10, 2009

(30) Foreign Application Priority Data

Jun. 5, 2008 (KR) ..... 10-2008-0053048

(51) Int. Cl.
*G02F 1/136* (2006.01)
*H01L 29/04* (2006.01)
(Continued)

(52) U.S. Cl.
CPC ..... *G02F 1/13624* (2013.01); *G02F 1/1368* (2013.01); *G02F 1/136213* (2013.01)

(58) Field of Classification Search
CPC ..... G02F 1/136213; G02F 1/136; G02F 2001/136245
USPC ..... 349/43, 42, 46, 47; 257/59, 72; 345/92
See application file for complete search history.

(56) References Cited

U.S. PATENT DOCUMENTS 5,469,025 A * 11/1995 Kanemori ..... G02F 1/1362 315/169.3
6,369,788 B1 * 4/2002 Yamazaki ..... G02F 1/13624 345/87

(Continued)

FOREIGN PATENT DOCUMENTS

JP 2006-133577 5/2006
JP 2006-276411 10/2006

(Continued)

OTHER PUBLICATIONS

Official Action issued by the Korean Intellectual Property Office on Apr. 3, 2015 in examination of Korean Patent Application No. 10-2014-0184578.

*Primary Examiner* — Anjan Deb
(74) *Attorney, Agent, or Firm* — F. Chau & Associates, LLC

(57) ABSTRACT

A display substrate includes a gate line, a data line, a pixel electrode, a storage line, a dual transistor, a connection transistor, a voltage-decreasing electrode, a first contact electrode and a second contact electrode. The voltage-decreasing electrode is disposed on the storage line. The voltage-decreasing electrode is connected to a connection drain electrode of the connection transistor. The first contact electrode overlaps with the first pixel part and is electrically connected to the first pixel part. The first contact electrode is connected to a first drain electrode of the dual transistor and a connection source electrode of the connection transistor. The second contact electrode overlaps with the second pixel part and is electrically connected to the second pixel part. The second contact electrode is connected to a second drain electrode of the dual transistor. Therefore, the aperture ratio of the display device may be increased.

24 Claims, 7 Drawing Sheets

(Amended)

(51) Int. Cl.

| | |
|---|---|
| ***G09G 3/36*** | (2006.01) |
| ***G02F 1/1362*** | (2006.01) |
| ***G02F 1/1368*** | (2006.01) |

(56) References Cited

U.S. PATENT DOCUMENTS

| | | | | |
|---|---|---|---|---|
| 7,193,588 | B2 * | 3/2007 | Lo | G09G 3/3233 315/169.1 |
| 7,206,048 | B2 | 4/2007 | Song | |
| 7,719,623 | B2 | 5/2010 | Hsieh et al. | |
| 8,164,702 | B2 * | 4/2012 | Park | G02F 1/13624 349/144 |
| 8,859,947 | B2 * | 10/2014 | Adachi | G03B 27/00 250/208.1 |
| 2004/0115953 | A1 * | 6/2004 | Yamazaki | G02F 1/13624 438/778 |
| 2004/0233368 | A1 * | 11/2004 | Kim et al. | 349/139 |
| 2006/0027812 | A1 * | 2/2006 | Yang | G02F 1/13454 257/72 |
| 2006/0250533 | A1 * | 11/2006 | Shih | G02F 1/136213 349/38 |
| 2007/0165149 | A1 * | 7/2007 | Kim | G02F 1/134336 349/39 |
| 2007/0197019 | A1 * | 8/2007 | Kang | G02F 1/13454 438/620 |
| 2008/0024689 | A1 * | 1/2008 | Ahn | 349/43 |
| 2008/0143912 | A1 * | 6/2008 | Kim | 349/48 |
| 2008/0174712 | A1 * | 7/2008 | Kim et al. | 349/48 |
| 2008/0211980 | A1 * | 9/2008 | Shin et al. | 349/39 |
| 2008/0303768 | A1 * | 12/2008 | Do et al. | 345/90 |

FOREIGN PATENT DOCUMENTS

| | | |
|---|---|---|
| KR | 1020060010118 | 2/2006 |
| KR | 1020070051045 | 5/2007 |
| KR | 1020070119848 | 12/2007 |
| KR | 1020080010987 | 1/2008 |

* cited by examiner ( Amended )

(AMENDED)

(Amended)

(Amended)

DISPLAY SUBSTRATE WITH DUAL TRANSISTOR AND CONNECTION TRANSISTOR, METHOD OF MANUFACTURING THE DISPLAY SUBSTRATE AND DISPLAY DEVICE HAVING THE DISPLAY SUBSTRATE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority under 35 U.S.C. §119 to Korean Patent Application No. 10-2008-0053048, filed on Jun. 5, 2008 in the Korean Intellectual Property Office (KIPO), the contents of which are herein incorporated by reference in their entirety.

BACKGROUND OF THE INVENTION

1. Technical Field

Exemplary embodiments of the present invention relate to a display substrate. More particularly, exemplary embodiments of the present invention relate to a display substrate, a method of manufacturing the display substrate, and a display device having the display substrate.

2. Discussion of the Related Art

Generally, a liquid crystal display (LCD) device includes a first substrate having pixel electrode formed in a unit pixel, a second substrate having common electrode opposite to the first substrate, and a liquid crystal layer interposed between the first and second substrates. An arrangement of liquid crystal molecules of the liquid crystal layer is varied in response to an electric field generated between the pixel electrode and the common electrode to change a light transmittance thereof, so that the liquid crystal display device may display images.

The pixel electrode may include first and second pixel parts receiving the different voltage levels, which are spaced apart from each other and enhance the viewing angle of images. A first pixel voltage may be applied to the first pixel part, and a second pixel voltage lower than the first pixel voltage may be applied to the second pixel part.

The first and second pixel voltages may be generated by using a data voltage transmitted through a data line. The first substrate may have a plurality of thin-film transistors (TFT) in the unit pixel. For example, the first substrate may include a first TFT electrically connected to the first pixel part, a second TFT electrically connected to the second pixel part, and a third TFT boosting or deboosting the data voltage to form the first and second pixel voltages in the first and second pixel parts, respectively.

A drain electrode of the first TFT overlaps with the first pixel part and is electrically connected to a first contact electrode making electrical contact with the first pixel part through a first contact hole. A drain electrode of the second TFT overlaps with the second pixel part and is electrically connected to a second contact electrode making electrical contact with the second pixel part through a second contact hole. A source electrode of the third TFT overlaps with the first pixel part and is electrically connected to a third contact electrode making electrical contact with the first pixel part through a third contact hole.

However, as the first to third contact electrodes overlap with the first and second pixel parts, the aperture ratio of the LCD device may be reduced. As a result, image display quality may be decreased.

SUMMARY OF THE INVENTION

An exemplary embodiment of the present invention provides a display substrate capable of increasing the viewing angle thereof, while simultaneously increasing the aperture ratio thereof.

An exemplary embodiment of the present invention provides a method for manufacturing the above-mentioned display substrate.

An exemplary embodiment of the present invention provides a display device including the above-mentioned display substrate.

According to one aspect of the present invention, a display substrate includes a gate line, a data line, a pixel electrode, a storage line, a dual transistor, a connection transistor, a voltage-decreasing electrode, a first contact electrode and a second contact electrode. The gate line is formed in a first direction. The gate line includes a first gate line and a second gate line that are adjacent to each other. The data line is formed in a second direction crossing the first direction. The pixel electrode has a first pixel part and a second pixel part that are spaced apart from each other. The storage line overlaps with the first and second pixel parts. The dual transistor is electrically connected to the first gate line and the data line. The dual transistor has a first drain electrode and a second drain electrode. The connection transistor is electrically connected to the second gate line. The voltage-decreasing electrode is disposed on the storage line. The voltage-decreasing electrode is connected to a connection drain electrode of the connection transistor. The first contact electrode overlaps the first pixel part and is electrically connected to the first pixel part. The first contact electrode is connected to a first drain electrode of the dual transistor and a connection source electrode of the connection transistor. The second contact electrode overlaps the second pixel part and is electrically connected to the second pixel part. The second contact electrode is connected to a second drain electrode of the dual transistor.

In an exemplary embodiment of the present invention, the gate line, the storage line, a gate electrode of the dual transistor and a connection gate electrode of the connection transistor may form a plurality of gate patterns that are patterned from an identical gate metal layer.

In an exemplary embodiment of the present invention, the data line, a source electrode and a drain electrode of the dual transistor, a connection source electrode and a connection drain electrode of the connection transistor, the voltage-decreasing electrode, the first contact electrode and the second contact electrode may form a plurality of data patterns that are patterned from an identical data metal layer.

In an exemplary embodiment of the present invention, the display substrate may further include a first insulation layer formed between the gate patterns and the data patterns, and a second insulation layer formed between the data patterns and the pixel electrode. The second insulation layer may have a first contact hole formed therethrough which electrically connects to the first pixel part and the first contact electrode, and a second contact hole formed therethrough which electrically connects to the second pixel part and the second contact electrode.

In an exemplary embodiment of the present invention, the display substrate may further include a voltage-increasing electrode disposed on the voltage-decreasing electrode that is electrically connected to the second pixel part. The pixel electrode and the voltage-increasing electrode may form a plurality of transparent metal patterns that are patterned from an identical transparent metal layer.

In an exemplary embodiment of the present invention, the second pixel part may have a shape covering a portion of the first pixel part. The first pixel part and the second pixel part may have a substantially symmetrical shape with respect to a center line which crosses a center portion of a unit pixel along the first direction.

Alternatively, the second pixel part may be spaced apart from the first pixel part in the second direction. The first and second pixel parts may have a substantially symmetrical shape with respect to a center line which crosses a center portion of a unit pixel along the second direction. The first and second gate lines may overlap the first pixel part.

In an exemplary embodiment of the present invention, the storage line may include a first storage line disposed between the first gate line and the second gate line that overlaps with the first pixel part, and a second storage line disposed on the first gate line that overlaps with the second pixel part. The storage line may further include a third storage line disposed below the first gate line that overlaps with the first pixel part. The third storage line may overlap the voltage-decreasing electrode to form the down-voltage capacitor.

According to one aspect of the present invention, manufacturing a display substrate may include forming a gate line, a storage line, a gate electrode, and a connection gate electrode on a substrate. The gate line includes a first gate line and a second gate line that are extended in a first direction, and the storage line is spaced apart from the gate line. The gate electrode of a dual transistor is connected to the first grate line, and the connection gate electrode of a connection transistor is connected to the second gate line. Then, an active pattern of the dual transistor and a connection active pattern of the connection transistor are formed. Then, a data line, a voltage-decreasing electrode, at source electrode of the dual transistor, a first drain electrode and a second drain electrode of the dual transistor, a first contact electrode, a second contact electrode, a connection source electrode of the connection transistor, and a connection drain electrode of the connection transistor are formed. The data line is formed in a second direction crossing the first direction. The voltage-decreasing electrode is disposed on the storage line. The source electrode of the dual transistor is connected to the data line. The first contact electrode is connected to the first drain electrode. The second contact electrode is connected to the second drain electrode. The connection source electrode of the connection transistor is connected to the first contact electrode. The connection drain electrode of the connection transistor is connected to the voltage-decreasing electrode.

Then, a pixel electrode including a first pixel part and a second pixel part is formed overlapping the storage line. The first pixel part overlaps the first contact electrode and is electrically connected to the first contact electrode. The second pixel part is spaced apart from the first pixel part, overlaps the second contact electrode, and is electrically connected to the second contact electrode.

In an exemplary embodiment of the present invention, a first insulation layer and at second insulation layer may be further formed. The first insulation layer covers the gate line, the storage line, the gate electrode and the connection gate electrode. The second insulation layer covers the data line, the voltage-decreasing electrode, the source electrode, the first drain electrode, the second drain electrode, the first contact electrode, the second contact electrode, the connection source electrode, and the connection drain electrode.

In the step of forming the second insulation layer, a portion of the second insulation layer may be removed to form a first contact hole and a second contact hole. The first contact hole contacts the first pixel part and the first contact electrode. The second contact hole contacts the second pixel part and the second contact electrode.

In the step of forming the pixel electrode, a voltage-increasing electrode may be further formed. The voltage-increasing electrode may be disposed on the voltage-decreasing electrode and is electrically connected to the second pixel part.

In an exemplary embodiment of the present invention, a display device includes a first substrate, a second substrate opposite to the first substrate, and a liquid crystal layer interposed between the first substrate and the second substrate. The first substrate includes a gate line, a data line, a pixel electrode, a storage line, a dual transistor, a connection transistor, a voltage-decreasing electrode, a first contact electrode and a second contact electrode. The gate line may be formed in a first direction. The gate line may include a first gate line and a second gate line that are adjacent to each other. The data line may be formed in a second direction crossing the first direction. The pixel electrode may include a first pixel part and a second pixel part that are spaced apart from each other. The storage line may overlap with the first and second pixel parts. The dual transistor may be electrically connected to the first gate line and the data line. The dual transistor may have a first drain electrode and at second drain electrode. The connection transistor may be electrically connected to the second gate line. The voltage-decreasing electrode may be disposed on the storage line. The voltage-decreasing electrode may be connected to a connection drain electrode of the connection transistor. The first contact electrode may overlap the first pixel part and may be electrically connected to the first pixel part. The first contact electrode may be connected to a first drain electrode of the dual transistor and a connection source electrode of the connection transistor. The second contact electrode may overlap the second pixel part and may be electrically connected to the second pixel part. The second contact electrode may be connected to a second drain electrode of the dual transistor. The second substrate may include a common electrode having a domain-dividing groove which divides the first and second pixel parts into a plurality of domains.

According to an exemplary embodiment of the present invention, as a first drain electrode of a dual transistor and a connection source electrode of a connection are electrically connected to an identical first contact electrode, a conventional contact electrode that is electrically connected to the connection drain electrode of the connection transistor may be omitted. Therefore, the aperture ratio of the display device may be increased.

BRIEF DESCRIPTION OF THE DRAWINGS

The above and other features and aspects of exemplary embodiments of the present invention will be described in detail with reference to the accompanying drawings.

DETAILED DESCRIPTION OF THE EXEMPLARY EMBODIMENTS

Figure 1:
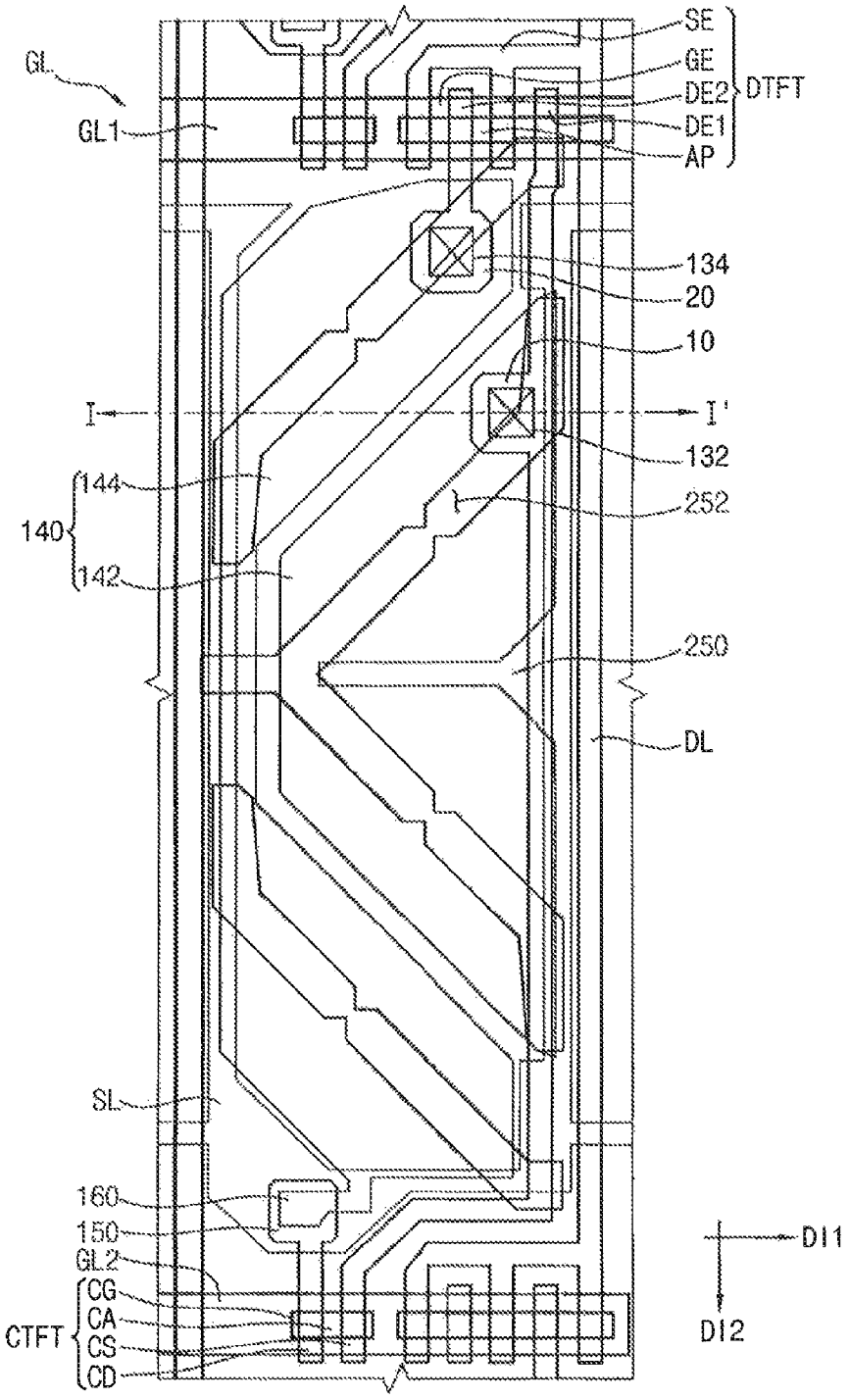
FIG. 1 is a plan view illustrating a unit pixel of a display device according to an exemplary embodiment of the present invention.

Exemplary embodiments of the present invention are described more fully hereinafter with reference to the accompanying drawings. The present invention may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Hereinafter, exemplary embodiments of the present invention will be explained in detail with reference to the accompanying drawings.

Figure 2:
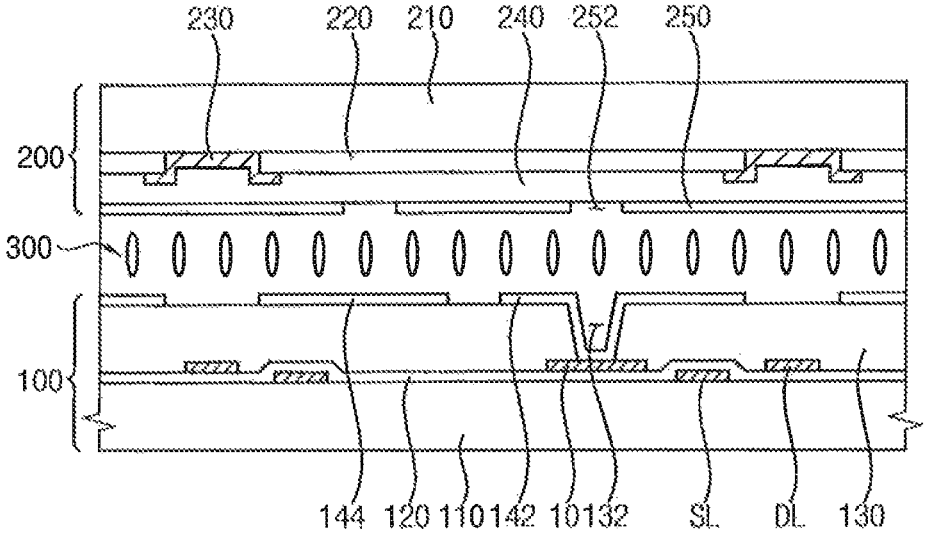
FIG. 2 is a cross-sectional view taken along a line I-I' of FIG. 1.
Figure 3:
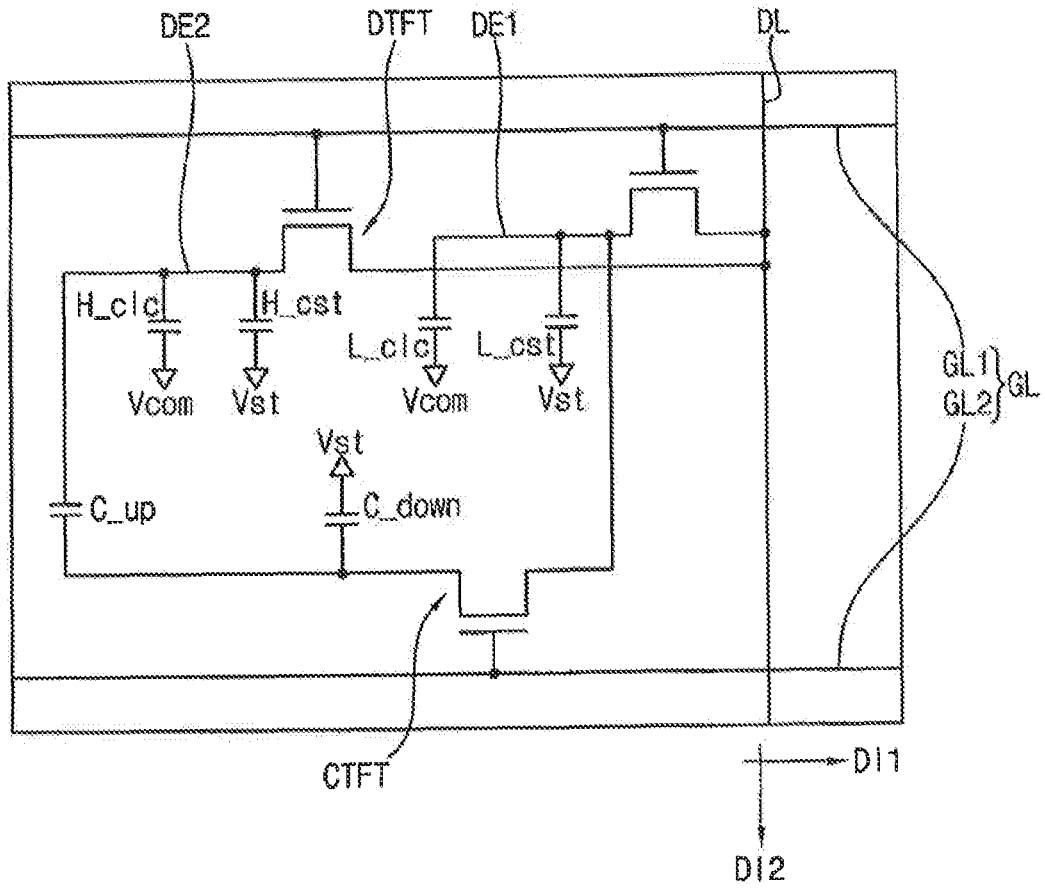
FIG. 3 is a circuit diagram schematically illustrating an electrical connection relationship of FIG. 1.

FIG. 1 is a plan view illustrating a unit pixel of a display device according to an exemplary embodiment of the present invention. FIG. 2 is a cross-sectional view taken along a line I-I' in FIG. 1. FIG. 3 is a schematic circuit diagram for explaining the electrical connection in FIG. 1.

Referring to FIGS. 1 and 2, the display device includes a first substrate 100, a second substrate 200 opposite to the first substrate 100, and a liquid crystal layer 300 interposed between the first and second substrates 100 and 200.

The first substrate 100 may include a first transparent substrate 110, gate lines GL, storage lines SL, a first insulation layer 120, a plurality of data lines DLs, a second insulation layer 130, a plurality of pixel electrodes 140, a plurality of dual transistors DTFTs, a plurality of connection transistors CTFT, a plurality of voltage-decreasing electrodes 150, a plurality of voltage-increasing electrodes 160, a plurality of first contact electrodes 10 and a plurality of second contact electrodes 20.

The first transparent substrate 110 may have a plate shape. The first transparent substrate 110 may include a transparent material such as glass, quartz and/or synthetic resins.

The gate lines GL are formed on the first transparent substrate 110, and are extended in a first direction DI1. Here, the gate lines GL include the first gate line GL1 and the second gate line GL2 that are adjacent to each other. The first gate line GL1 and the second gate line GL2 are parallel to each other.

The storage lines SL and the gate lines GL are formed on the first transparent substrate 110. Each of the storage lines SL is formed between the first gate line GL1 and the second gate line GL2.

The first insulation layer 120 is formed on the first transparent substrate 110 to cover the gate lines GL and the storage lines SL. The first insulation layer 120 may include, for example, silicon oxide (SiOx), silicon nitride (SiNx), etc.

The data lines DL are formed on the first insulation layer 120, and are extended in a second direction DI2 crossing the first direction DI1. Here, the first direction DI1 is perpendicular to the second direction DI2.

The first contact electrode 10 and the second contact electrode 20 are formed on the first insulation layer 120, and are formed in each unit pixel. The first and second contact electrode 10 and 20 may have a square side.

The second insulation layer 130 is formed on the first insulation layer 120 to cover the data lines DL, the first contact electrode 10 and the second contact electrode 20. A first contact hole 132 is formed through the second insulation layer 130 at the location of the first contact electrode 10, and a second contact hole 134 is formed through the second insulation layer 130 at the location of the second contact electrode 20. In an exemplary embodiment, the first contact hole 132 and the second contact hole 134 may each have a square shape. Each area of the first and second contact holes 132 and 134 is smaller than that of the first and second contact electrodes 10 and 20, respectively.

The second insulation layer 130 may be an organic insulation layer or an inorganic insulation layer. For example, when the second insulation layer 130 is the organic insulation layer, each of the first contact hole 132 and the second contact hole 134 may have a size of about 12 μm×12 μm, and each of the first contact electrode 10 and the second contact electrode 20 may have a size of about 38 μm×38 μm. Alternatively, when the second insulation layer 130 is the inorganic insulation layer, each of the first contact hole 132 and the second contact hole 134 may have a size of about 6 μm×6 μm, and each of the first contact electrode 10 and the second contact electrode 20 may have a size of about 18 μm×18 μm.

The pixel electrodes 140 are formed on the second insulation layer 130, respectively, within each unit pixels. The pixel electrodes 140 may include an optically transparent and electrically conductive material, for example, indium tin oxide (ITO), indium zinc oxide (IZO), amorphous indium tin oxide (a-ITO), etc.

Each of the pixel electrodes 140 include a first pixel part 142 and a second pixel part 144 that are spaced apart from each other. The first pixel part 142 may be formed in a center area of each unit pixel. The first pixel part 142 may have a substantially symmetrical shape with respect to a center line which crosses the center portion of the unit pixel along the first direction. The second pixel part 144 may be formed in a peripheral area of each first pixel part 142 and may surround the first pixel part 142. The second pixel part 144 may have a substantially symmetrical shape with respect to the center line.

The first pixel part 142 makes electrical contact with the first contact electrode 10 through the first contact hole 132. The second pixel part 144 makes electrical contact with the second contact electrode 20 through the second contact hole 134. Here, the first and second contact electrodes 10 and 20 may be formed over the center line when viewed on a plan view. Alternatively, the first contact electrode 10 may be formed under the center line when viewed on a plan view.

The first and second pixel parts 142 and 144 are formed on the second insulation layer 130 and overlap with the storage line SL. The storage line SL may overlap end portions of the first and second pixel parts 142 and 144.

The second substrate 200 may include a second transparent substrate 210, a plurality of color filters 220, a light-blocking part 230, a planarization layer 240 and a common electrode 250.

The second transparent substrate 210 may be disposed opposite to the first substrate 100. The second transparent substrate 210 may have a plate shape. The second transparent substrate 210 may be formed of transparent material such as glass, quartz, and/or synthetic resins, etc.

The color filters 220 are formed on the second transparent substrate 210 opposite to the pixel electrode 140. The color filters 220 may include a red color filter, a green color filter and a blue color filter.

The light-blocking part 230 is disposed between the color filters 220 and blocks light. For example, the light-blocking part 230 may cover the gate lines GL, the data lines DL and the thin-film transistors (TFT).

The planarization layer 240 may be formed on the color filters 220 and the light-blocking part 230 and may planarize a surface of the display device.

The common electrode 250 is formed on the planarization layer 240. The common electrode 250 includes an optically transparent and electrically conductive material that may be the same as that of the pixel electrode 140. The common electrode 250 include a domain-dividing groove 252 that divides each of the first pixel parts 142 and the second pixel parts 144 into a plurality of domains. For example, the domain-dividing groove 252 may have a substantially V-shape opposite to the first pixel part 142 and the second pixel part 144.

Hereinafter, the DTFT, the CTFT, the voltage-decreasing electrodes 150 and the voltage-increasing electrodes 160 of the first substrate 100 will be explained in further detail.

Each of the DTFTs includes gate a electrode GE, an active pattern AP, a source electrode SE, a first drain electrode DE1 and a second drain electrode DE2.

The gate electrode GE may be a portion of the first gate line GL. The active pattern AP is formed on the first insulation layer 120, and overlaps the gate electrode GE. The active pattern AP may be extended in a first direction DI1. The source electrode SE is connected to the data line DL, and overlaps a portion of the active pattern AP. The source electrode SE may have a shape of two connected U-shapes.

The first drain electrode DE1 and the second drain electrode DE2 are spaced apart from each other. The first and second electrodes DE1 and DE2 are formed on the first insulation layer 120. The first and second drain electrodes DE1 and DE2 are spaced apart from the source electrode SE, and overlap a portion of the active pattern AP.

The first drain electrode DE1 is formed between one of the two members of U-shapes of the source electrode SE, and is extended in a second direction DI2 and is electrically connected to the first contact electrode 10. Thus, the first drain electrode DE1 is electrically connected to the first pixel part 142. The second drain electrode DE2 is formed between one of the two numbers of U-shapes of the source electrode SE, and is extended in a second direction DI2 and is electrically connected to the second contact electrode 20.

Each of the CTFTs includes a connection gate electrode CG, a connection active pattern CA, a connection source electrode CS and a connection drain electrode CD.

The connection gate electrode CG may be a portion of the second gate line GL2. The connection active pattern CA is formed on the first insulation layer 120 and overlaps with the connection gate electrode CG. The connection active pattern CA may be extended in a first direction DI1.

The connection source electrode CS is formed on the first insulation layer 120, and overlaps a portion of the connection active pattern CA. The connection source electrode CS is extended toward the first pixel part 142 and is electrically connected to the first contact electrode 10. As a result, the connection source electrode CS is electrically connected to the first pixel part 142.

The connection drain electrode CD is formed on the first insulation layer 120, and overlaps a portion of the connection active pattern CA. The connection drain electrode CD is spaced apart from the connection source electrode CS.

The voltage-decreasing electrodes 150 are formed on the first insulation layer 120 and overlap the storage line SL. Each of the voltage-decreasing electrodes 150 is electrically connected to the connection drain electrode CD.

The voltage-increasing electrodes 160 are formed on the second insulation layer 130, and protrude from the second pixel part 144 and overlap the voltage-decreasing electrodes 150. The voltage-increasing electrodes 160 may include an optically transparent and electrically conductive material that may be substantially the same as the pixel electrode 140. The storage line SL and the voltage-decreasing electrode 150 may define a down-voltage capacitor C_down. The voltage-decreasing electrode 150 and the voltage-increasing electrode 160 may define an up-voltage capacitor C_up.

Hereinafter, an electrical connection relationship of the unit pixel as shown in FIG. 1 will be described with reference to the accompanying FIG. 3.

The gate line GL is formed in a first direction DI1. The gate line GL may include the first gate lines GL1 and the second gate lines GL2 that are adjacent to each other. The data line DL is formed along the second direction DI2.

A gate electrode of the dual transistor DTFT is electrically connected to the first gate line GL1. A source electrode of the dual transistor DTFT is electrically connected to the data line DL.

A first drain electrode DE1 of the dual transistor DTFT is electrically connected to a first electrode of a low liquid crystal capacitor L_clc, a first electrode of the low storage capacitor L_cst and a connection source electrode of the connection transistor CTFT.

A second drain electrode DE2 of the dual transistor DTFT is electrically connected to a first electrode of a high liquid crystal capacitor H_clc, a first electrode of the high storage capacitor H_cst and a first electrode of the up-voltage capacitor C_up.

A connection gate electrode of the connection transistor CTFT is electrically connected to the second gate line GL2, and a connection drain electrode of the connection transistor CTFT is electrically connected to a second electrode of the up-voltage capacitor C_up and a first electrode of the down-voltage capacitor C_down.

Here, the first electrode of the low liquid crystal capacitor L_clc and the first electrode of the low storage capacitor L_cst make up the first pixel part 142. The second electrode of the low liquid crystal capacitor L_clc makes up the common electrode 250. The second electrode of the low storage capacitor L_cst makes up the storage line SL.

Moreover, the first electrode of the high liquid crystal capacitor H_clc and the first electrode of the high storage capacitor H_cst make up the second pixel part 144. The second electrode of the high liquid crystal capacitor H_clc makes up the common electrode 250. The second electrode of the storage capacitor H_cst makes up the storage line SL.

Furthermore, the first electrode of the up-voltage capacitor C_up makes up the voltage-increasing electrode 160. The second electrode of the up-voltage capacitor C_up and the first electrode of the down-voltage capacitor C_down make up the voltage-decreasing electrode 150. The second electrode of the down-voltage capacitor C_down makes up the storage line SL.

A common voltage Vcom is applied to the common electrode 50, and a storage reference voltage Vst is applied to the storage line SL.

Figure 4:
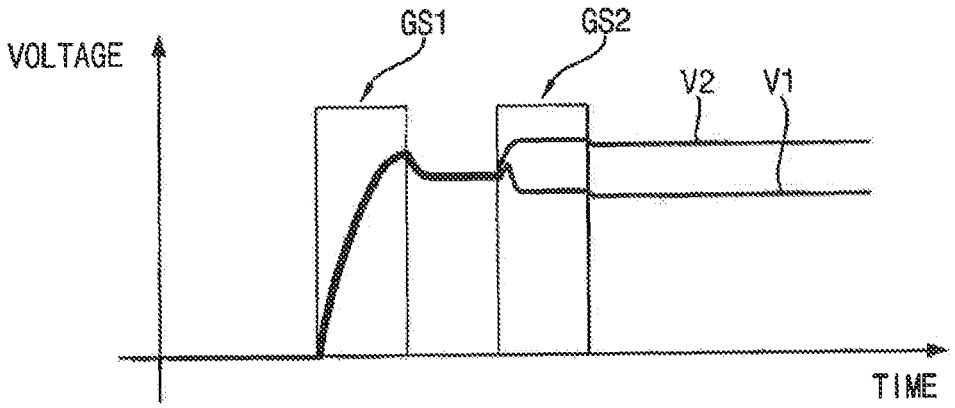
FIG. 4 is a graph illustrating a variation of a voltage in first and second pixel parts of FIG. 3.

FIG. 4 is a graph illustrating a variation of a voltage in first and second pixel parts of FIG. 3. In FIG. 4, a voltage charged in the first pixel part 142 is defined as the first pixel voltage V1, and a signal applied to the first gate line GL1 is defined as the first gate signal GS1. Moreover, a signal applied to the second gate line GL2 is defined as the second gate signal GS2.

Referring to FIG. 4, when the first gate signal GS1 is applied to the first gate line GL1, the first and second pixel voltages V1 and V2 gradually increase until they are substantially the same as the data voltage that is applied through the date lines DL.

Then, when the second gate signal GS2 is applied to the second gate line GL2, the first pixel voltage V1 may be decreased until it is lower than the data voltage, and the second pixel voltage V2 may be increased until it is higher than the data voltage. As a result, the second pixel voltage V2 may be higher than the first pixel voltage V1.

According to an exemplary embodiment, the first substrate 100 includes the voltage-increasing electrode 160 forming the up-voltage capacitor C_up. Alternatively, the voltage-increasing electrode 160 may be omitted. The up-voltage capacitor C_up may be omitted from the circuit of FIG. 3.

When the up-voltage capacitor C_up is omitted, after the first and second gate signals GS1 and GS2 are continuously applied to the first and second gate lines GL1 and GL2, the first pixel voltage V1 may be dropped lower than the data voltage, and the second pixel voltage V2 may maintain a level of the data voltage. As a result, a level of the second pixel voltage V2 may be higher than that of the first pixel voltage V1.

Hereinafter, a method of manufacturing the first substrate will be described with reference to FIGS. 1 and 2.

Referring again FIGS. 1 and 2, a gate metal layer is formed on the first transparent substrate 110, and then the gate metal layer is patterned to form the gate lines GL, the storage lines SL, the gate electrodes GE of the dual transistors DTFT and the connection gate electrodes CG of the connection transistors CTFT.

Then, the first insulation layer 120 is formed on the first transparent substrate 110. The first insulation layer 120 covers the gate patterns formed from the gate metal layer.

Then, an active layer is formed on the first insulation layer 120, and the active layer is patterned to form the active patterns AP of the dual transistors DTFT and the connection active patterns CA of the connection transistors CTFT.

Then, a data metal layer is formed on the first insulation layer 120. The data metal layer covers the active patterns AP and the connection active patterns CA, and then the data metal layer is patterned to form the data lines DL, the source electrodes SE and the first and second drain electrodes DE1 and DE2 of the dual transistors DTFT, the connection source electrodes CS and the connection drain electrodes CD of the connection transistors CTFT, the voltage-decreasing electrodes 150, the first contact electrodes 10 and the second contact electrodes 20.

According to an exemplary embodiment, the data metal layer is formed after the active layer is patterned, and then the data metal layer is patterned. Alternatively, the active layer and the data metal layer are sequentially formed, and then the active layer and the data metal may be patterned by using the same mask.

Then, the second insulation layer 130 is formed on the first insulation layer 120. The second insulation layer 130 covers the data patterns formed from the data metal layer. Then a portion of the second insulation layer 130 is removed and the first and second contact holes 132 and 134 are formed.

Then, a transparent metal layer is formed on the second insulation layer 130, and then the transparent metal layer is patterned to form a plurality of transparent metal patterns. Here, the transparent metal patterns include the pixel electrodes 140 and the voltage-increasing electrodes 160. Each of the pixel electrodes 140 includes the first pixel part 142 electrically connected to the first contact electrode 10 through the first contact hole 132, and the second pixel part 144 electrically connected to the second contact electrode 20 through the second contact hole 134. Alternatively, the voltage-increasing electrodes 160 may be omitted.

Figure 5:
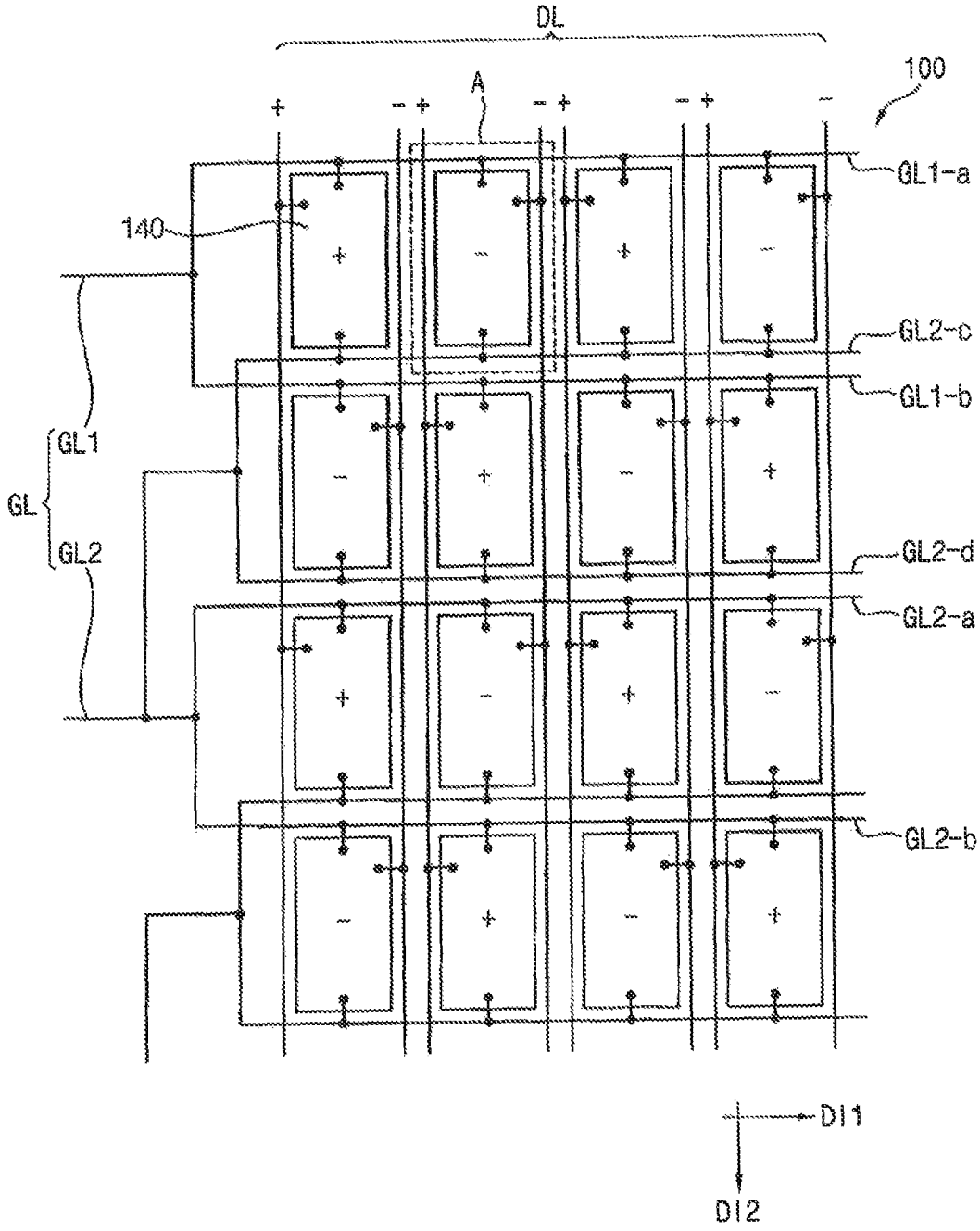
FIG. 5 is a plan view schematically illustrating a first substrate of a display device according to an exemplary embodiment of the present invention.

FIG. 5 is a plan view schematically illustrating a first substrate of a display device according to an exemplary embodiment of the present invention. An exemplary embodiment of the present invention includes a first substrate 100, a second substrate opposite to the first substrate 200 and a liquid crystal layer 300 interposed between the first and second substrates 100 and 200.

Referring to FIG. 5, the first substrate 100 includes a plurality of gate lines GL formed in the first direction DI1, a plurality of data lines DL formed in a second direction DI2 crossing the first direction DI1, and a plurality of pixel electrodes 140 electrically connected to the gate and data lines GL and DL. For example, each of the pixel electrodes 140 is disposed within the unit pixels arranged in a matrix shape. For example, the number of the pixel electrodes 140 may be 4,096×2,160. For example, the number of the pixel electrodes 140 may be 3,840×2,160.

The gate lines GL may include a first gate line GL1 and a second gate line GL2 that are adjacent to each other and transfer a first gate signal and a second gate signal, respectively. The first gate line GL1 may include a first upper line GL1-a and a first lower line GL1-b that are adjacent to each other, and the second gate line GL2 may include a second upper line GL2-a and a second lower line GL2-b that are adjacent to each other. The first upper line GL1-a, the first lower line GL1-b, the second upper line GL2-a and the second lower line GL2-b correspond with the four rows of the pixel electrodes 140 in the second direction DI2.

The data lines DL may be formed at both sides of each row of the pixel electrodes 140. For example, a first data line is disposed at a left side of the pixel electrodes that are arranged in a first row and provide odd-numbered pixel electrodes of the first row pixel electrodes with the data voltages. A second data line is disposed at a right side of the pixel electrodes that are arranged in the first row and provide even-numbered pixel electrodes of the first row pixel electrodes with the data voltages. Further, a third data line is disposed at a left side of the pixel electrodes that are arranged in a second row and provide even-numbered pixel electrodes of the second row pixel electrodes. A forth data line is disposed at a right side of the pixel electrodes that are arranged in a second row and provide the odd-numbered pixel electrodes of the second row pixel electrodes with the data voltages.

When the data voltages applied to the data lines DL is alternated such that there are different polarities along the first direction DI1, and the polarities of the data voltage are inverted with respect to each other for each frame, the pixel electrodes 140 may perform a dot inversion for each frame.

The second gate line GL2 may include an upper voltage-decreasing line GL2-c adjacent to the first upper line GL1-a, and a lower voltage-decreasing line GL2-d adjacent to the first lower line GL1-b. The upper voltage-decreasing line GL2-c is disposed adjacent to the first upper line GL1-a and transfers the second gate signal to the pixel electrodes arranged in a first row. The lower voltage-decreasing line GL2-d is disposed adjacent to the first lower line GL1-b and transfers the second gate signal to the pixel electrodes arranged in a second row.

Figure 6:
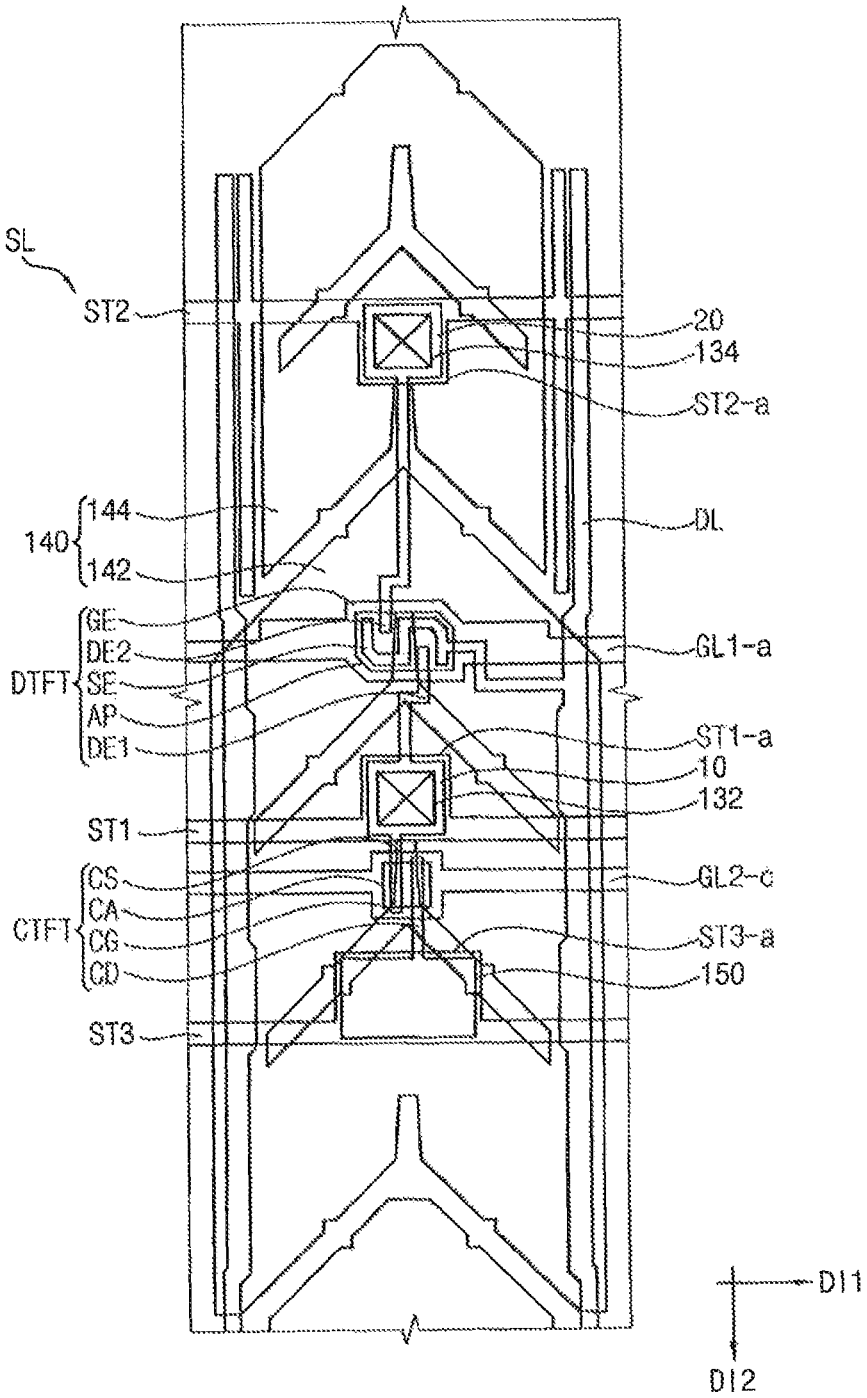
FIG. 6 is an enlarged plan view illustrating a unit pixel of the first substrate of FIG. 5.
Figure 7:
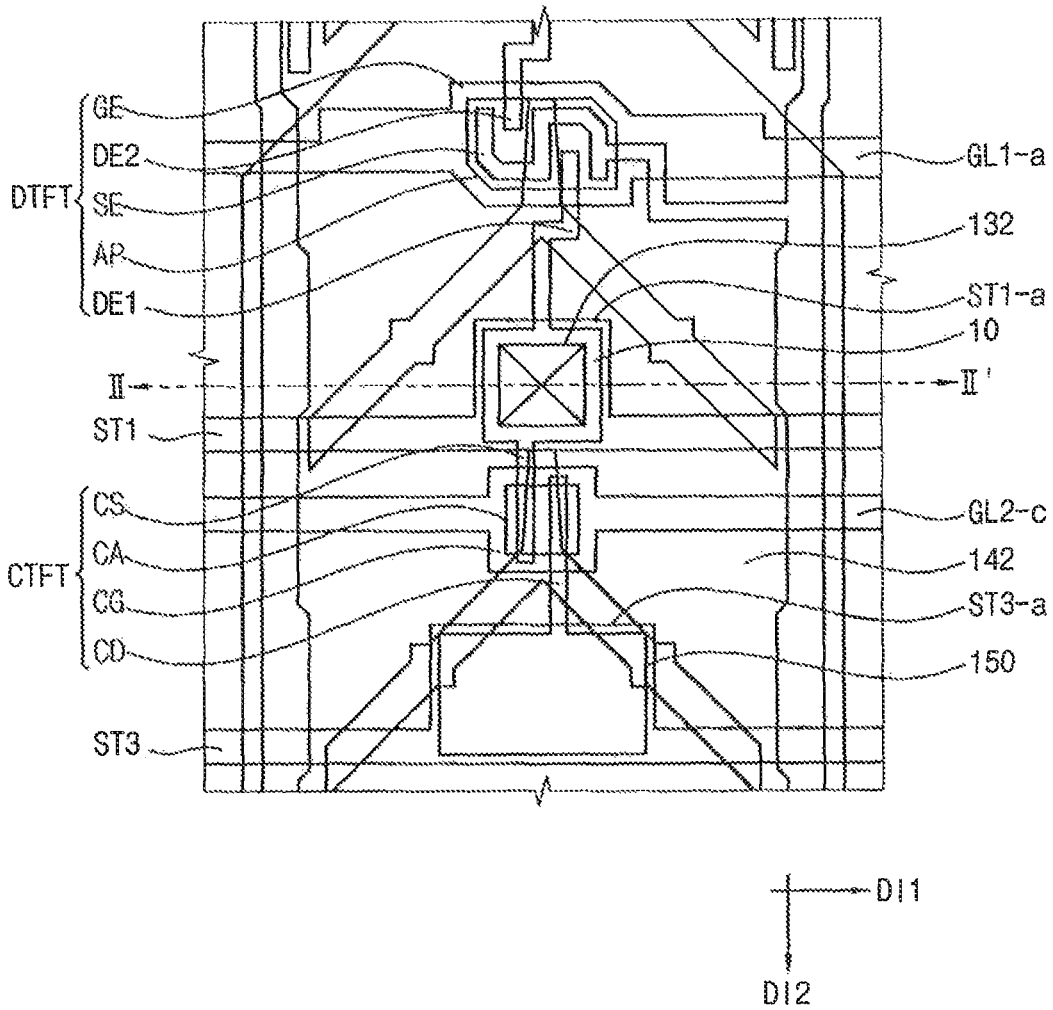
FIG. 7 is an enlarged plan view illustrating a portion of the unit pixel of FIG. 6.
Figure 8:
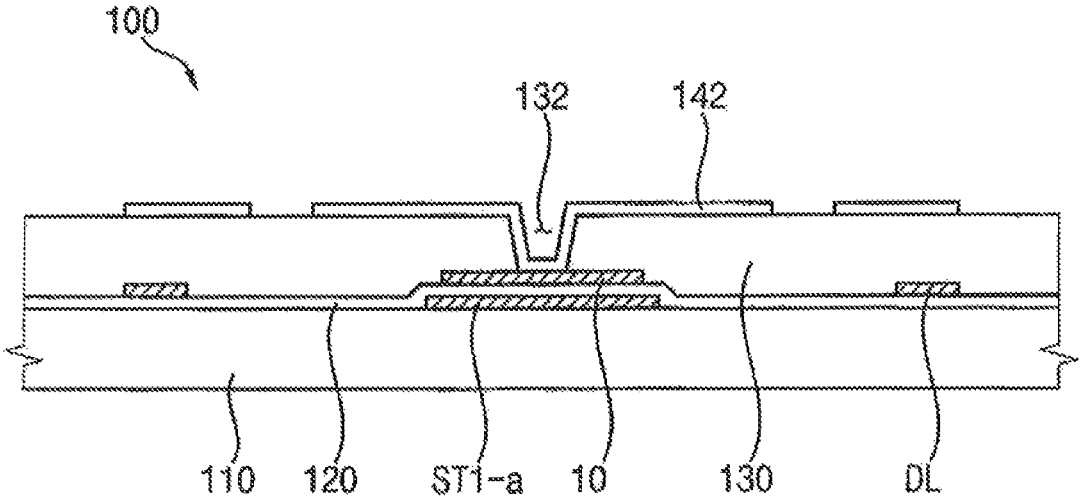
FIG. 8 is a cross-sectional view taken along a line II-II' of FIG. 7.

FIG. 6 is an enlarged plan view illustrating a unit pixel of the first substrate of FIG. 5. FIG. 7 is an enlarged plan view illustrating a portion of the unit pixel of FIG. 6. FIG. 8 is a cross-sectional view taken along a line II-II' of FIG. 7.

Referring to FIGS. 6, 7 and 8, the first substrate 100 may include a plurality of gate lines GL, a plurality of data lines DL and a plurality of pixel electrode 140. The first substrate 100 may further include a first transparent substrate 110, a plurality of storage lines SL, a first insulation layer 120, a second insulation layer 130, a plurality of dual transistors DTFT, a plurality of connection transistors CTFT, a plurality of voltage-decreasing electrodes 150, a plurality of first contact electrodes 10 and a plurality of second contact electrodes 20.

The first transparent substrate 110 may have a plate shape. The first transparent substrate 110 may include a transparent material such as glass, quartz, synthetic resins, etc.

The gate lines GL are formed on the first transparent substrate 110, and are extended in a first direction DI1. For example, first upper line GL1-a and an upper voltage-decreasing line GL2-c are formed on the first transparent substrate 110, and are extended in the first direction DI1.

The storage lines SL are formed on the first substrate 110 same as the gate lines GL, and overlap each of the pixel electrodes 140. Each of the storage lines SL may include a first storage line ST1, a second storage line ST2 and a third storage line ST3 that are extended along the first direction DI1.

For example, the first storage line ST1 may be disposed between the first upper line GL1-a and the upper voltage-decreasing line GL2-a. The second storage line ST2 may be disposed on the first upper line GL1-a. The third storage line ST3 may be disposed below the upper voltage-decreasing lines GL2-c.

The first insulation layer 120 is formed on the first transparent substrate 110 and covers the gate lines GL and the storage lines SL. The first insulation layer 120 may include, for example, silicon oxide (SiOx), silicon nitride (SiNx), etc.

The data lines DL are formed on the first insulation layer 120, and are extended in a second direction DI2 crossing the first direction DI1. Here, the first direction DI1 and the second direction DI2 may be perpendicular to each other.

The first and second contact electrodes 10 and 20 are formed on the first insulation layer 120, and are formed in unit pixels, respectively. The first and second contact electrode 10 and 20 may have a side with a square shape.

The second insulation layer 130 is formed on the first insulation layer 120 and covers the data lines DL, the first contact electrode 10 and the second contact electrode 20. A first contact hole 132 is formed through the second insulation layer 130 corresponding to the first contact electrode 10, and a second contact hole 134 is formed through the second insulation layer 130 corresponding to the second contact electrode 20. According to an exemplary embodiment, the first and second contact hole 132 and 134 may have a square shape. Each area of the first and second contact holes 132 and 134 is smaller than that of the first and second contact electrodes 10 and 20.

The pixel electrodes 140 are formed on the second insulation layer 130, within each unit pixels. The pixel electrodes 140 may include an optically transparent and electrically conductive material. Each of the pixel electrodes 140 include a first pixel part 142 and a second pixel part 144 that are spaced apart from each other.

For example, the second pixel part 144 may be disposed on the first pixel part 142. The first and second pixel parts 142 and 144 may have a substantially symmetrical shape with respect to a center line which crosses a center portion of a unit pixel along the first direction DI2. For example, the first and second pixel parts 142 and 144 may be substantially V-shaped. An area of the first pixel part 142 may be larger than that of the second pixel part 144.

The first pixel part 142 makes electrical contact with the first contact electrode 10 through the first contact hole 132. The second pixel part 144 makes electrical contact with the second contact electrode 20 through the second contact hole 134.

The first and second pixel parts 142 and 144 are formed on the second insulation layer 130 and overlap with the storage line SL. The first storage line ST1 may overlap with the first pixel part 142, and the second storage line ST2 may overlap with the second pixel part 144. The third storage line ST3 may overlap with the first pixel part 142. Alternatively, the first storage line ST1 may include a first storage part ST1-a formed at a position corresponding to the first contact electrode 10, and the second storage line ST2 may include a second storage part ST2-a formed at a position corresponding to the second contact hole 20.

The second substrate (not shown) may include a second transparent substrate, a plurality of color filters, a light-blocking part, a planarization layer and a common electrode.

The second transparent substrate may be disposed to opposite the first substrate 100. The color filters are formed on the second transparent substrate and are opposite to the pixel electrodes 140. The light-blocking part is disposed between the color filters and block light. The planarization layer may be formed on the color filters and the light-blocking part and may planarize a surface of the display device. The common electrode is formed on the planarization layer. The common electrode may include an optically transparent and electrically conductive material. The common electrode includes a plurality of domain-dividing grooves to divide each of the first pixel parts 142 and the second pixel parts 144 into a plurality of domains. For example, the domain-dividing groove may be substantially V-shaped and may correspond to the first pixel part 142 and the second pixel part 144.

Hereinafter, the dual transistors DTFT, the connection transistors CTFT and the voltage-decreasing electrodes 150 of the first substrate 100 will be described in detail.

Each of the dual transistors DTFT may include a gate electrode GE, an active pattern AP, a source electrode SE, a first drain electrode DE1 and a second drain electrode DE2.

The gate electrode GE may protrude from the first upper line GL1-a. The active pattern AP is formed on the first insulation layer 120 and overlaps with the gate electrode GE. The source electrode SE is connected to the data line DL, and overlaps a portion of the active pattern AP. The source electrode SE may include a lower opening electrode having a U-shape opened toward a lower side and an upper opening electrode having a U-shape opened toward an upper side.

The first drain electrode DE1 and the second drain electrode DE2 are formed on the first insulation layer 120 and are spaced apart from each other. The first and second drain electrodes DE1 and DE2 are spaced apart from the source electrode SE, and overlap a portion of the active pattern AP.

The first drain electrode DE1 is formed between the lower opening electrodes, and is extended toward a lower side along a second direction DI2 and is electrically connected to the first contact electrode 10. The second drain electrode DE2 is formed between the upper opening electrodes, and is extended toward an upper side along a second direction DI2 and is electrically connected to the second contact electrode 20.

Each of the connection transistors CTFT may include a connection gate electrode CG, a connection active pattern CA, a connection source electrode CG and a connection drain electrode CD.

The connection gate electrode CG may protrude form the upper voltage-decreasing line GL2-c. The connection active pattern CA is formed on the first insulation layer 120 and overlaps with the connection gate electrode CG. The connection source electrode CS is formed on the first insulation layer 120, and overlaps with a portion of the connection active pattern CA. The connection source electrode CS is extended toward the first storage line ST1 and is electrically connected to the first contact electrode 10. The connection drain electrode CD is formed on the first insulation layer 120, and overlaps with a portion of the connection active pattern (CA). The connection drain electrode CD is spaced apart from the connection source electrode CS, and is extended toward the third storage line ST3.

The voltage-decreasing electrodes 150 is formed on the first insulation layer 120 and overlaps with the third storage line ST3 of the storage lines SL. Each of the voltage-decreasing electrodes 150 is electrically connected to the connection drain electrode CD. The third storage line ST3 may include the third storage part ST3-a formed at a position corresponding to the voltage decreasing electrode 150. The storage line SL and the voltage-decreasing electrode 150 may define a down-voltage capacitor C_down.

According to an exemplary embodiment, an electrical connection relationship of the unit pixel described above with respect to FIG. 6 is substantially the same as the electrical connection relationship of display device described above with respect to FIG. 3 except that an up-voltage capacitor is not included in the unit pixel.

Moreover, a voltage variation of the first and second pixel parts 142 and 144 in FIG. 6 is substantially the same as a voltage variation of the first and second pixel voltages 142 and 144 of display device as described above with respect to FIG. 4 except for the effect of the up-voltage capacitor.

Hereinafter, a method of manufacturing the first substrate will be described with reference to FIGS. 6, 7 and 8.

Referring again to FIGS. 6, 7 and 8, a gate metal layer is formed on the first transparent substrate 110, and the gate metal layer is patterned to form the gate lines GL, the storage lines SL, the gate electrodes GE of the dual transistors DTFT and the connection gate electrodes CG of the connection transistors CTFT. Here, each of the gate lines GL may include the first and second gate lines GL1 and GL2, and each of the storage lines DL may include the first, second and third storage lines ST1, ST2 and ST3.

Then, the first insulation layer 120 is formed on the first transparent substrate 110 to cover gate patterns formed from the gate metal layer.

Then, an active layer is formed on the first insulation layer 120, and then the active layer is patterned to form the active patterns AP of the dual transistors DTFT and the connection active patterns CA of the connection transistors CTFT.

Then, a data metal layer is formed on the first insulation layer 120 to cover the active patterns AP and the connection active patterns CA. The data metal layer is patterned to form the data lines DL, the source electrodes SE and the first and second drain electrodes DE1 and DE2 of the dual transistors DTFT, the connection source electrodes CS and the connection drain electrodes CD of the connection transistors CTFT, the voltage-decreasing electrodes 150, the first contact electrodes 10 and the second contact electrodes 20.

According to an exemplary embodiment of the present invention, the data metal layer is formed after the active layer is patterned, and then the data metal layer is patterned. Alternatively, the active layer and the data metal layer are sequentially formed, and then the active layer and the data metal may be patterned by using the same mask.

Then, the second insulation layer 130 is formed on the first insulation layer 120 such that the second insulation layer 130 covers the data patterns formed from the data metal layer, and then a portion of the second insulation layer 130 is removed to form the first and second contact holes 132 and 134.

Then, a transparent metal layer is formed on the second insulation layer 130, and the transparent metal layer is patterned forming the pixel electrodes 140. Each of the pixel electrodes 140 may include the first pixel part 142 electrically connected to the first contact electrode 10 through the first contact hole 132, and the second pixel part 144 electrically connected to the second contact electrode 20 through the second contact hole 134. The second pixel part 144 is disposed on the first pixel part 142.

According to exemplary embodiments of the present invention, a first drain electrode of a dual transistor and a connection source electrode of a connection transistor are electrically connected to a first contact electrode. A conventional contact electrode that is electrically connected to a connection drain electrode of the connection transistor may be omitted. Therefore, as the conventional contact electrode that overlaps a first pixel part to reduce an aperture ratio is omitted, the aperture ratio of the display device may be increased.

The foregoing is illustrative of exemplary embodiments of the present invention and is not to be construed as limiting to the invention. Although exemplary embodiments of the present invention have been described, those skilled in the art will readily appreciate that many modifications may be made to the exemplary embodiments without materially departing from the present invention.

What is claimed is:

1. A display substrate comprising:

a gate line formed in a first direction, the gate line comprising a first gate line and a second gate line adjacent to the first gate line;

a data line formed in a second direction;

a pixel electrode having a first pixel part and a second pixel part that are spaced apart from each other;

a storage line overlapping the first and second pixel parts;

a dual transistor electrically connected to the first gate line and the data line, the dual transistor having a first drain electrode and a second drain electrode,

*wherein a first source electrode and a second source electrode are connected to the data line*;

a connection transistor electrically connected to the second gate line;

a voltage-decreasing electrode disposed on the storage line, the voltage-decreasing electrode being connected to a connection drain electrode of the connection transistor;

a first contact electrode overlapping the first pixel part and electrically connected to the first pixel part, the first contact electrode being connected to the first drain electrode of the dual transistor and a connection source electrode of the connection transistor; and a second contact electrode overlapping the second pixel part and electrically connected to the second pixel part, the second contact electrode being connected to the second drain electrode of the dual transistor,

*wherein the first contact electrode, the first drain electrode and the connection source electrode form a contiguous line extending from the first drain electrode to the connection source electrode*.

2. The display substrate of claim 1, wherein the gate line, the storage line, a gate electrode of the dual transistor and a connection gate electrode of the connection transistor are patterned from an identical gate metal layer and form a plurality of gate patterns.

3. The display substrate of claim 2, wherein the data line, [a source electrode] *the first and second source electrodes of the dual transistor* and [a drain electrode] *the first and second drain electrodes* of the dual transistor, the connection source electrode and the connection drain electrode of the connection transistor, the voltage-decreasing electrode, the first contact electrode and the second contact electrode are patterned from an identical data metal layer and form a plurality of data patterns.

4. The display substrate of claim 3, further comprising:

a first insulation layer formed between the gate patterns and the data patterns; and a second insulation layer formed between the data patterns and the pixel electrode.

5. The display substrate of claim 4, wherein the second insulation layer has a first contact hole through which the first pixel part and the first contact electrode are electrically connected, and the second insulation layer also has a second contact hole through which the second pixel part and the second contact electrode are electrically connected.

6. The display substrate of claim 1, further comprising a voltage-increasing electrode disposed on the voltage-decreasing electrode, the voltage-increasing electrode being electrically connected to the second pixel part of the pixel electrode.

7. The display substrate of claim 6, wherein the pixel electrode and the voltage-increasing electrode are patterned from an identical transparent metal layer and form a plurality of transparent metal patterns.

8. The display substrate of claim 1, wherein the second pixel part of the pixel electrode covers a portion of the first pixel part of the pixel electrode.

9. The display substrate of claim 8, wherein the first pixel part of the pixel electrode and the second pixel part of the pixel electrode are each substantially symmetrical with respect to a center line which crosses center portion of a unit pixel along the first direction.

10. The display substrate of claim 1, wherein the second pixel part of the pixel electrode is spaced apart from the first pixel part of the pixel electrode in the second direction.

11. The display substrate of claim 10, wherein the first pixel part of the pixel electrode and the second pixel part of the pixel electrode are substantially symmetrical with respect to a center line which crosses a center portion of a unit pixel along the second direction.

12. The display substrate of claim 10, wherein the first and second gate lines are overlapped with the first pixel part of the pixel electrode.

13. The display substrate of claim 12, wherein the storage line comprises:

a first storage line disposed between the first gate line and the second gate line, the first storage line overlapping with the first pixel part of the pixel electrode; and a second storage line disposed on the gate line, the second storage line overlapping with the second pixel part of the pixel electrode.

14. The display substrate of claim 13, wherein the storage line further comprises a third storage line disposed below the first gate line and overlapping with the first pixel part of the pixel electrode, wherein the third storage line is overlapped with the voltage-decreasing electrode and forms a down-voltage capacitor.

15. A display device comprising:

a first substrate;

a second substrate opposite to the first substrate; and a liquid crystal layer interposed between the first substrate and the second substrate, the first substrate comprising:

a gate line formed in a first direction, the gate line comprising a first gate line and a second gate line adjacent to the first gate line;

a data line formed in a second direction;

a pixel electrode having a first pixel part and a second pixel part that are spaced apart from each other;

a storage line overlapping the first and second pixel parts;

a dual transistor electrically connected to the first gate line and the data line, the dual transistor having a first drain electrode and a second drain electrode, *wherein a first source electrode and a second source electrode are connected to the data line*;

a connection transistor electrically connected to the second gate line;

a voltage-decreasing electrode disposed on the storage line, the voltage-decreasing electrode being connected to a connection drain electrode of the connection transistor;

a first contact electrode overlapping the first pixel part and electrically connected to the first pixel part, the first contact electrode being connected to the first drain electrode of the dual transistor and a connection source electrode of the connection transistor; and a second contact electrode overlapping the second pixel part and electrically connected to the second pixel part, the second contact electrode being connected to the second drain electrode of the dual transistor,

*wherein the first contact electrode, the first drain electrode and the connection source electrode form a contiguous line extending from the first drain electrode to the connection source electrode*.

16. The display claim 15, wherein the second substrate comprises a common electrode having a domain-dividing groove which divides the first and second pixel parts of the pixel electrode and forms a plurality of domains.

*17. The display device of claim 15, wherein the first contact electrode, the first drain electrode and the connection source electrode are formed from a same layer as the data line.*

*18. The display device of claim 15, wherein the contiguous line comprises a first portion extending in the first direction, and a second portion extending in the second direction.*

*19. The display device of claim 15, wherein a length of the contiguous line according to the second direction is larger than a length of the first pixel part according to the second direction.*

*20. The display device of claim 15, wherein a length from the first drain electrode to the first contact electrode is larger than a length from the second drain electrode to the second contact electrode.*

*21. The display substrate of claim 1, wherein the first contact electrode, the first drain electrode and the connection source electrode are formed from a same layer as the data line.*

*22. The display substrate of claim 1, wherein the contiguous line comprises a first portion extending in the first direction, and a second portion extending in the second direction.*

*23. The display substrate of claim 1, wherein a length of the contiguous line according to the second direction is larger than a length of the first pixel part according to the second direction.*

*24. The display substrate of claim 1, wherein a length from the first drain electrode to the first contact electrode is larger than a length from the second drain electrode to the second contact electrode.*

* * * * *